(12) United States Patent
Cheah et al.

(10) Patent No.: US 8,234,434 B2
(45) Date of Patent: Jul. 31, 2012

(54) SYSTEM AND METHOD FOR OPERATING A MEDIA DEVICE

(75) Inventors: Sin Hui Cheah, Carmel, IN (US); Fengshuan Zhou, Carmel, IN (US)

(73) Assignee: Thomson Licensing, Boulogne (FR)

(*) Notice: Subject to any disclaimer, the term of this patent is extended or adjusted under 35 U.S.C. 154(b) by 431 days.

(21) Appl. No.: 12/085,499

(22) PCT Filed: Nov. 21, 2006

(86) PCT No.: PCT/US2006/045073
§ 371 (c)(1),
(2), (4) Date: May 22, 2008

(87) PCT Pub. No.: WO2007/064536
PCT Pub. Date: Jun. 7, 2007

(65) Prior Publication Data
US 2010/0153607 A1    Jun. 17, 2010

Related U.S. Application Data

(60) Provisional application No. 60/741,391, filed on Dec. 1, 2005.

(51) Int. Cl.
*G06F 13/00* (2006.01)
(52) U.S. Cl. ......... 710/303; 710/304; 710/301; 713/320
(58) Field of Classification Search .......... 710/301–306; 341/176; 713/320–340
See application file for complete search history.

(56) References Cited

U.S. PATENT DOCUMENTS

| | | | | |
|---|---|---|---|---|
| 5,935,226 A * | 8/1999 | Klein | | 710/303 |
| 7,028,128 B2 * | 4/2006 | Zhang et al. | | 710/305 |
| 7,375,673 B2 * | 5/2008 | Spilo | | 341/176 |
| 7,624,218 B2 * | 11/2009 | Juenger | | 710/303 |
| 2003/0215102 A1 | 11/2003 | Marlowe | | |
| 2004/0151327 A1 | 8/2004 | Marlowe | | |
| 2006/0127034 A1 * | 6/2006 | Brooking et al. | | 386/46 |
| 2006/0277555 A1 * | 12/2006 | Howard et al. | | 720/600 |
| 2007/0101039 A1 * | 5/2007 | Rutledge et al. | | 710/303 |

FOREIGN PATENT DOCUMENTS

| | | |
|---|---|---|
| JP | 20001022705 A | 1/2001 |
| JP | 2006174335 A | 6/2006 |

(Continued)

OTHER PUBLICATIONS

Michael Miller, Cedia Expo 2005: Home Theater Trends, Sep. 16, 2005, Indianapolis, IN.

(Continued)

*Primary Examiner* — Brian Misiura
*Assistant Examiner* — Kim Huynh
(74) *Attorney, Agent, or Firm* — Robert D. Shedd; Vincent E. Duffy; Michael A. Pugel

(57) ABSTRACT

A media device and docking device used in a home entertainment system are described. The entertainment system 100 includes a docking device operating in several modes allowing the media device to be charged by the docking device and allowing the docking device to be used for conveying a signal to the media device from the docking device when the media device is connected to the docking station and conveying the signal through the docking device to another media device when the first media device is not connected to the docking device.

22 Claims, 7 Drawing Sheets

FOREIGN PATENT DOCUMENTS

WO    2005032115 A2    4/2005

OTHER PUBLICATIONS

Harmon Kardon, Press Release Harmon Kardon Introduces "The Bridge" Ipod docking station Sep. 9, 2005, Woodbury, NY.
Correspondence from EPO, Boulogne Cedex France dated Feb. 2, 2009.
Search Report Dated March 12, 2007.
Perton, "DLO Home Dock Links iPods to Stereo. TV", engadget.com, Sep. 21, 2005.
Digital Lifestyle Outfitters:, "DLO HomeDock for IPOD User Manual", dlo.com, 2005.
Harmon/Kardon Int'l Ind., "Owner's Manual: The Bridge—IPod Docking Station,"2005, http://manuals.harman.com, 9 pages.
Sony: "Video Cassette Recorder Operating Manual", 1998.

* cited by examiner

SYSTEM AND METHOD FOR OPERATING A MEDIA DEVICE

This application claims the benefit under 35 U.S.C. §365 of International Application PCT/US2006/045073, filed Nov. 21, 2006, which was published in accordance with PCT article 21(2) on Jun. 7, 2007, in English and which claims the benefit under 35 U.S.C. §119 of a provisional application 60/741,391 filed in the United States on Dec. 1, 2005.

FIELD OF THE INVENTION

The present disclosure relates generally to an electronic interface device and more specifically toward a docking device for use with a media device as both a charging station and connection interface to a home entertainment system.

BACKGROUND OF THE INVENTION

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Consumer electronics devices continue to expand in both capability and portability. Media devices capable of storing complete libraries of music and/or still pictures are now readily available in packages that are small enough to carry around almost anywhere. In addition, newer portable media devices can be equipped with a large storage element, such as a hard disk drive, and a small video quality liquid crystal display (LCD). These new devices can now record and play back several hours of video content. In this manner, the portable media device mimics many of the characteristics of more stationary media devices typically found in a home entertainment system. As a result, many of these portable devices could readily be utilized with a home entertainment system. For instance, a photograph that may be stored on the portable device could be viewed on a high resolution video monitor instead of the small display associated with the portable device.

A problem associated with using portable devices in a home entertainment system involves the inconvenience of connecting and disconnecting the portable device from the stationary home entertainment system. Additionally, many of these portable media devices are associated with and utilize a secondary device, commonly known as a docking device or station. The docking station serves as a recharging station for the device.

Often it may be necessary or desirable to connect the portable media device in one manner to a signal source device such as a DVD player or set top box and in another manner to a display device such as a television. Input and output connectors for these portable media devices may be inconveniently located for repeated connection and disconnection or the devices may not possess spare connectors. Further, connection and disconnection of the portable media device may additionally require disconnection and reconnection of other devices in the home entertainment system. It is therefore desirable to provide a system and method to allow a portable media device to be conveniently interfaced into a home entertainment system while still maintaining the portability of the portable media device.

SUMMARY OF THE INVENTION

The disclosed embodiments relate to a method and apparatus for using an electronic media device such as a portable media device with a docking device in a home entertainment system containing additional media devices. The method includes conveying a signal to a media device from a docking station when the media device is connected to the docking station and conveying the signal through the docking station to another media device when the first media device is not connected to the docking station.

In another embodiment, the docking device includes a first interface for connecting the docking device to the portable electronic device, the first interface permitting the docking device to charge the portable electronic device and to route signals to and from the portable electronic device, a second interface for connecting the docking device to a media device, the second interface permitting the docking device to route the signals from the media device, a third interface for connecting the docking device to a second media device, the third interface permitting the docking device to route signals to the second media device, and a switch for switchably connecting the second interface to the third interface when the portable electronic device is not connected to the docking device and for switchably connecting the first interface to the second interface when said portable electronic device is connected to the docking device.

The characteristics and advantages of the present invention may become more apparent from the following description, given by way of example.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following describes a system and circuits used for interfacing a portable media device with a home entertainment system. The embodiment describes interfacing analog audio and video signals between components in the home entertainment system. Other systems and circuits used in conjunction with a portable media device may include very similar structures. Those of ordinary skill in the art will appreciate that the embodiment of the circuits described herein is merely one potential embodiment. As such, in alternate embodiments, the components of the system may be rearranged or omitted, or additional components may be added based on particular attributes of the system. For example, with minor modifications, the circuits described may be configured to interface digital audio and video signals such as those complying with the High Definition Multimedia Interface (HDMI) signal standard.

Figure 1:
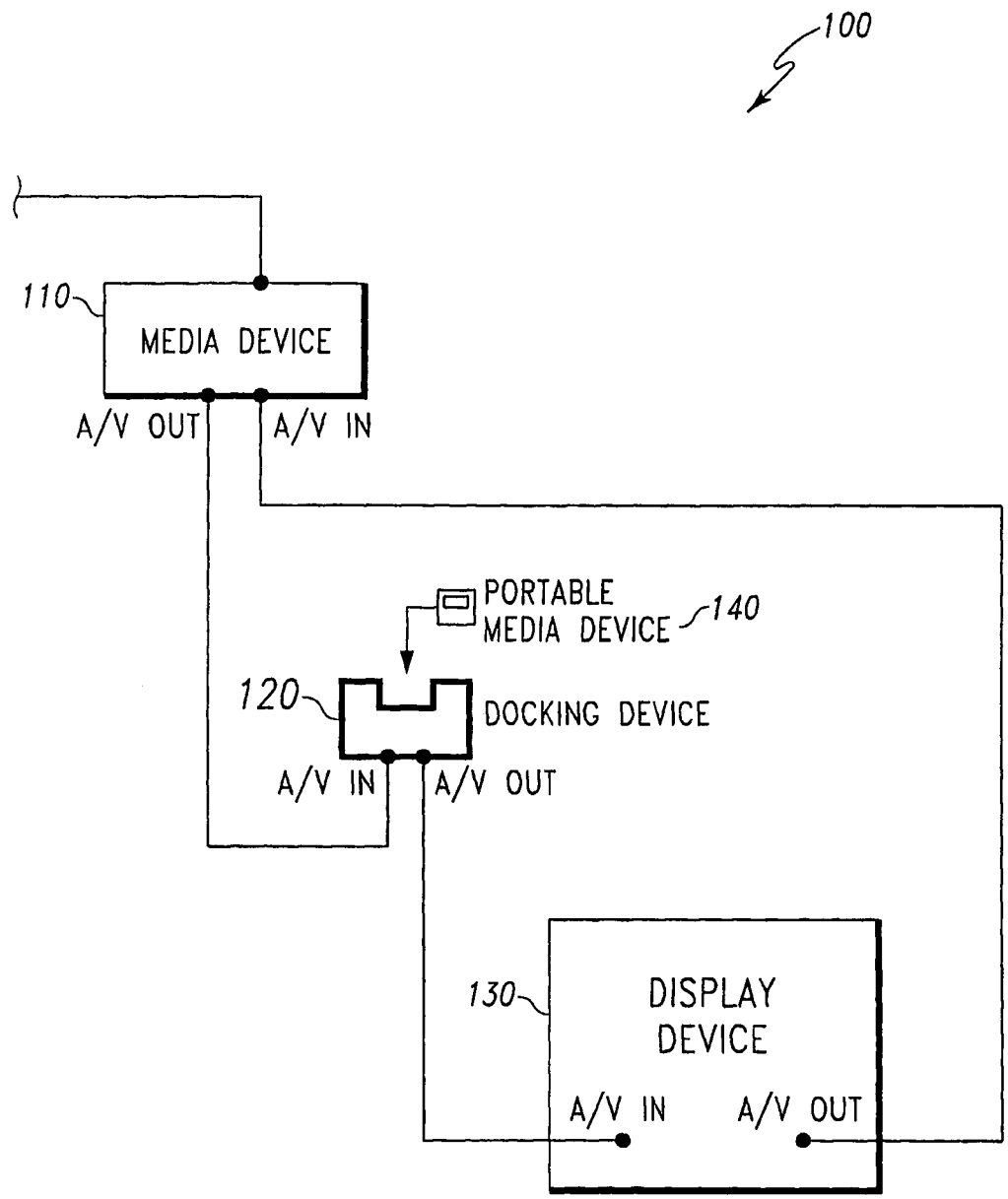
FIG. 1 is a block diagram of an exemplary system using an embodiment of the present invention.

Turning now to FIG. 1 an exemplary block diagram of a home entertainment system 100 using an embodiment of the present invention is shown. Home entertainment system 100 includes a media device 110, a docking station 120, a portable media device 140, and a second media device used as a display device 130. Media device 110 receives signals from, and provides signals to, other devices in the home entertainment system. Media device 110 may be a component within the home entertainment system. Media device 110 may alternatively serve as the main component of the home entertainment system. In one embodiment, media device 110 may be a home A/V controller or receiver. In another embodiment, media device 110 may be a device for playing and recording the audio and video content such as a video cassette recorder or a personal digital video recorder. In yet another embodiment, media device 110 may also be a set top box or a home computer device.

The signals provided from or to media device 110 may represent stereo or mono audio content and video content in either an analog or digital format. Media device 110 may also include an external signal input. The external signal input may receive one or more signals containing content originating external to the home. For example, the external signal input may be connected to a cable or satellite network or an internet connection. Media device 110 may also include processing for the external signal including demodulation and signal format conversion.

Media device 110 may also include one or more (audio/video) A/V inputs and one or more A/V outputs. The A/V input(s) and A/V output(s) may include one or more connectors capable of connecting video and left and right audio signals through a signal connector or may include individual connectors for each video and audio signal input and output. Media device 110 may further include a control circuit, user interface, and switching circuitry for switching and routing of signals based on user inputs. The switching and routing allows one or more of the signals that are provided to the A/V inputs, along with the processed signal from the external signal input, to be routed through switches and circuitry in the media device 110 to one or more of the A/V outputs.

Media device 110 may also include a content storage medium either as an integral or removable element. For example, the storage medium may be a hard disk drive or mechanical tape deck employing removable magnetic tape cartridges. The control circuit may also control the routing of signals, representing audio and video data content, to and from the storage medium.

One of the A/V outputs from the A/V device 110 is connected to the A/V input of docking device 120 through an electrical cable. Docking device 120 contains circuits for interfacing to external audio and video components such as those found in a home entertainment system. The docking device 120 also includes circuitry for charging and providing power to the portable media device 140. Typically, the portable media device 140 is placed into or docked in the docking device 120 for charging or powering through an electrical connection. The docking device 120 and portable media device 140 are often associated together as a unit to account for individual operating conditions of the portable media device 140.

The docking station 120 and portable media device 140 also includes a connector, not shown, for the connection of signals such as audio and video signals between the portable media device 140 and the docking station 120 when the portable media device 140 is placed into the docking station 120. The operation of the docking station 120 and portable media device 140 will be described in further detail below.

The A/V output from docking station 120 is connected to the A/V input of a second media device, such as display device 130, through an electrical cable. Display device 130 may include a visual display element such as a cathode ray tube (CRT) or liquid crystal display (LCD) screen for displaying a video signal to a user. Display device 130 may also include a sound generation element such as one or more speakers for outputting an audio signal to the user. In addition to display and audio functions, the display device 130 may include one or more sets of A/V inputs and A/V outputs. Display device 130 may be capable of a number of different modes of switching and routing of A/V signals between A/V inputs and A/V outputs. In a preferred embodiment, display device 130 may provide only a through connection between a set of A/V inputs and A/V outputs. One of the A/V outputs from the display device 130 is connected to one of the A/V inputs on the media device 110 through an electrical cable.

The interconnection between the media device 110, the docking device 120, and the display device 130 provides a loop or ring connection. The loop or ring connection arrangement allows signal routing between the media device 110, docking device 120 and associated portable media device 140, and display device 130 with a minimum use of A/V connections and a minimum of signal routing and switching.

Figure 2:
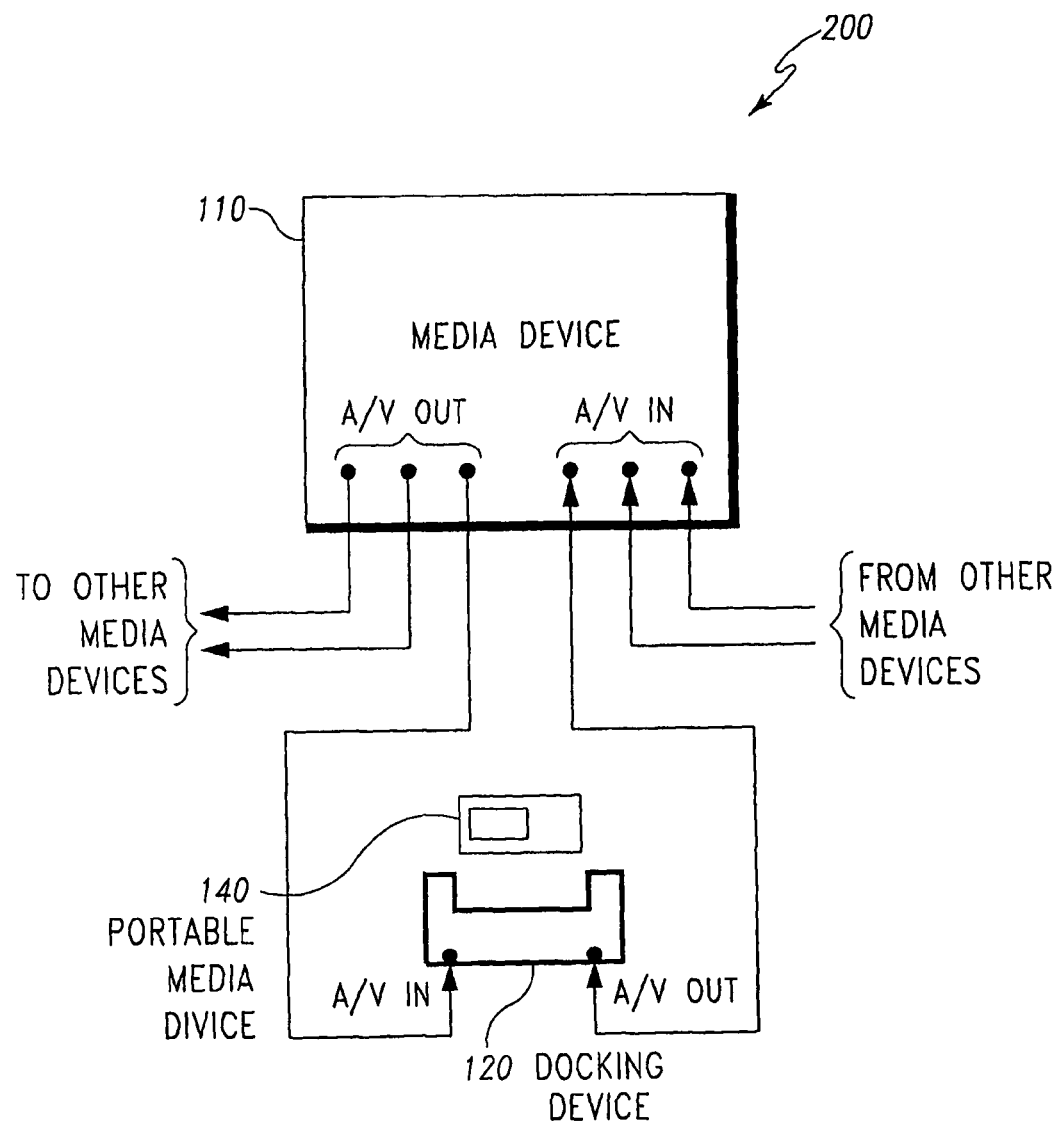
FIG. 2 is a block diagram of another exemplary system using an embodiment of the present invention.

Turning to FIG. 2, another exemplary block diagram of a home entertainment 200 shows a single media device 110 connected to a docking station 120, and a portable media device 140. Media device 110, docking device 120 and portable media device 140 have functions similar to those described in FIG. 1 and will not be further described here except as needed. Media device 110 includes a set of A/V input connectors and A/V output connectors allowing connection of several additional media devices. In a preferred embodiment, media device 110 has audio and video inputs and audio and video outputs for a DVD player, a set top box, a display device, and an auxiliary device.

One of the A/V output connectors from media device 110 is connected to the A/V input connector on docking device 120. The connection provides audio and video signals from through the media device 110 to the docking device 220. As described earlier, the docking station may provide the audio and video signals to the portable media device 140, for instance, when the portable media device is placed into the docking. The A/V output connector from the docking device 120 is connected to one of the A/V input connectors of the media device 110. The portable media device 140 may also provide signals through the docking device 120 to the media device 110, for instance, when the portable media device 140 is connected to the docking device 120.

Figure 3:
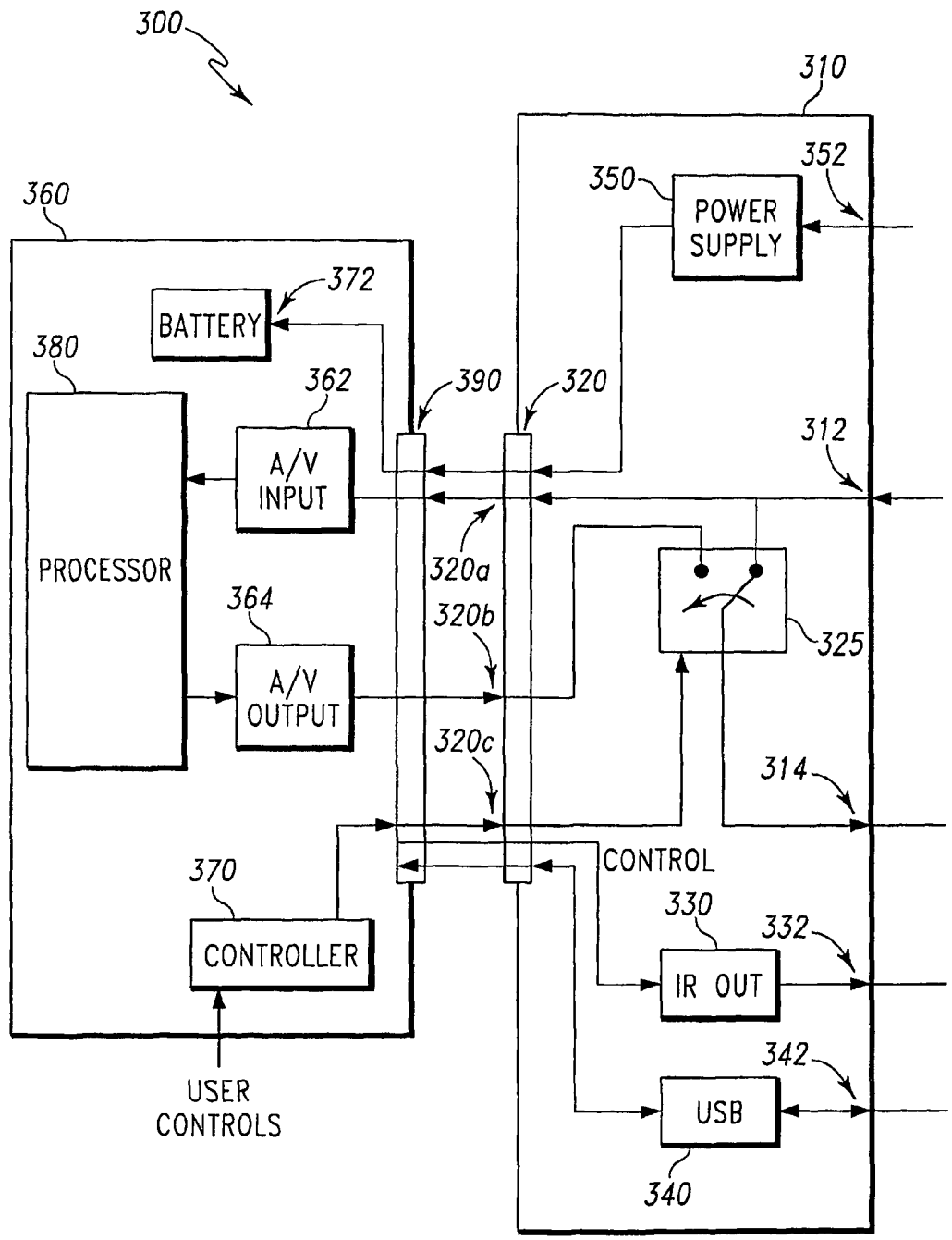
FIG. 3 is a block diagram of an embodiment of the present invention.

Turning to FIG. 3, a block diagram illustrating a docking station 310 and a portable media device 360 is shown, collectively identified as 300. Docking station 310 and portable media device 360 contain features similar to docking device 120 and portable media device 140 in FIG. 1. The docking station 310 includes an A/V in connector 312. A/V in connector 312 provides an input interface for left/right audio and video signals provided to the docking station from external signal sources such as an A/V device 110 described in FIG. 1. Docking station 310 also includes an A/V out connector 314. A/V out connector 314 provides an output interface for left/right audio and video signals provided from the docking station to external devices such as display device 130 described in FIG. 1.

Portable media device connector 320 provides connections, both mechanical and electrical, to the portable media device 360. The signal connection for the A/V signal to the portable media device 360 is labeled 320a. The signal connection for the A/V signal from the portable media device 360 is labeled 320b. The portable media device connector 320 also contains a connection for the docking station control, labeled 320c.

A switch 325 is connected to both the A/V out connector 314 and A/V in connector 312. Switch 325 may include any number of different types of switches capable of passing audio and video signals. In a preferred embodiment, switch 325 is a double throw type switch having two switch states. The common connection of switch 325 is connected to A/V out connector 314. One throw or position of the switch 325 is connected to A/V in connector 312. The second throw or position of the switch 325 is connected to the A/V output from portable media device 360 at connector 320b. The A/V in connector 312 is additionally connected to the A/V input for the portable media device 360 at connector 320a.

Although switch 325 is shown in a particular configuration with the common connection connected to A/V out connector 314, other switch configurations, including more than one switch may be used. For example, in another embodiment the common connection of switch 325 can be connected to A/V in connector 312. One throw of switch 325 would be connected to A/V out connector 314. The other throw of switch 325 would be connected to the A/V input for the portable media device 360 at connector 320a. Additionally, a second switch may be used in a manner combining both of the switch configurations described.

A control input on switch 325 is connected to docking station control at connector 320c. The control input on switch 325 controls which switch state of switch 325 is currently active or selected.

Docking station 310 also includes a DC input connector 352. DC input connector 352 is used for inputting power in the form of a DC voltage, such as 5V. DC power to the docking station may be provided from an external power transformer connected to a wall outlet. DC power is used to power the circuitry in the docking station as well as to power and provide recharging for the portable media device 360 through power supply 350 when it is plugged into the docking station. Power for operation or charging of the portable media device 360 is provided through one or more connectors on the portable media device connector 320.

The docking station 310 may also include an infra-red (IR) interface circuit 330 for performing IR control of external devices, such as televisions or set top boxes, through IR connector 332. The signal for IR control is provided from the portable media device 360 through portable media device connector 320. Docking station 310 may also include a USB interface connector 340 for facilitating bidirectional communication of digital signals between the portable media device 360 and other external devices such as computers or computer peripherals.

Portable media device 360 contains an interface connector 390 that interfaces with the portable media device connector 320. The audio and video signals provided from portable media device connector 320 are provided to A/V input circuit 362. A/V input circuit 362 conditions the audio and video signals. Conditioning of the audio and video signals may include gain control, signal component separation, or frequency equalization as is well known to one skilled in the art.

The conditioned audio and video signals, in analog signal format, are provided to processor 380 for processing audio and video signals in both an analog signal format and a digital signal format. Processor 380 may also contain circuitry for converting audio and video signals from an analog format to a digital format or from a digital format to an analog format. Processor 380 may further include a motion picture entertainment group (MPEG) standard type MP3 audio encoder for converting digital audio into a specific MP3 digital audio format. Processor 380 may also include an MPEG standard type MPEG-4 video encoder for converting the digital video into a specific MPEG-4 digital video format.

Processor 380 also provides processed signals to A/V output circuit 364. A/V output circuit 364 provides audio and video signals in analog or digital form to interface connector 390. Processor 380 may also process signals and provide signals to other circuits in the portable media device 360, such as a display, headphone connector, memory, or hard disk drive, not shown. Further, processor 380 may process and convey signals to external digital signal devices through the USB circuitry 340 and USB connector 342 on docking station 310.

In an alternate embodiment A/V input circuit 362 contains the necessary analog to digital conversion circuits for converting the input signals into a digital format. The A/V output circuit 364 contains the necessary digital to analog conversion circuits for converting the digitals signals for outputting as analog signals. In the alternate embodiment, processor 380 only processes signals in digital format.

Portable media device 360 also contains a controller 370. Controller 370 may contain circuitry for interfacing to user controls through a user interface and also may provide control for operating all of the blocks of the portable media device 360 including the processor 380. Controller 370 also provides the control signal to the switch 325 through interface connector 390.

Portable media device 360 also includes a battery 372 for providing internal power for the portable media device 360. Battery 372 may be charged through a signal connection made to the docking device 310 through interface connector 390.

Figure 4:
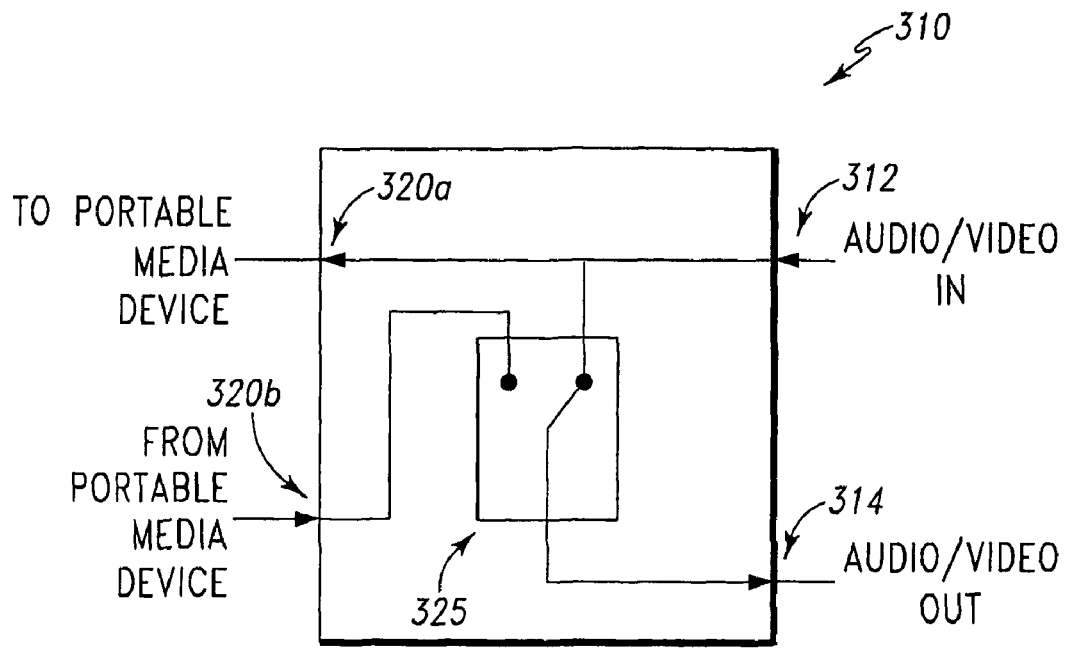
FIG. 4 is an illustration of one operating mode of an embodiment of the present invention.

Turning to FIG. 4, an illustration of a portion of the docking device 310 is shown. The illustration shows a simplified connection configuration shows the connection of the switch 325 and A/V connectors 312 and 314 to external devices. The configuration also shows and audio/video signal routing to connector 320. Switch 325 is shown in a switch state representing loop mode. Loop mode may be used when the portable media device 360 is not connected to, or sitting in, the docking station 310. Loop mode may also be used when the portable media device 360 is sitting in the docking station 310 but is not turned on or active for processing signals. For example, portable media device 360 may be sitting in the docking station 310 so that the docking station 310 may charge the battery in the portable media device 360. Loop mode connects the A/V in connector 312 to the A/V out connector 314 through the switch 325. In this manner, the audio and video signals at the A/V in connector 312 are provided to the A/V out connector 314 effectively looping through the docking station 310 without providing the signals to the portable media device 360 or outputting signals from the portable media device.

Figure 5:
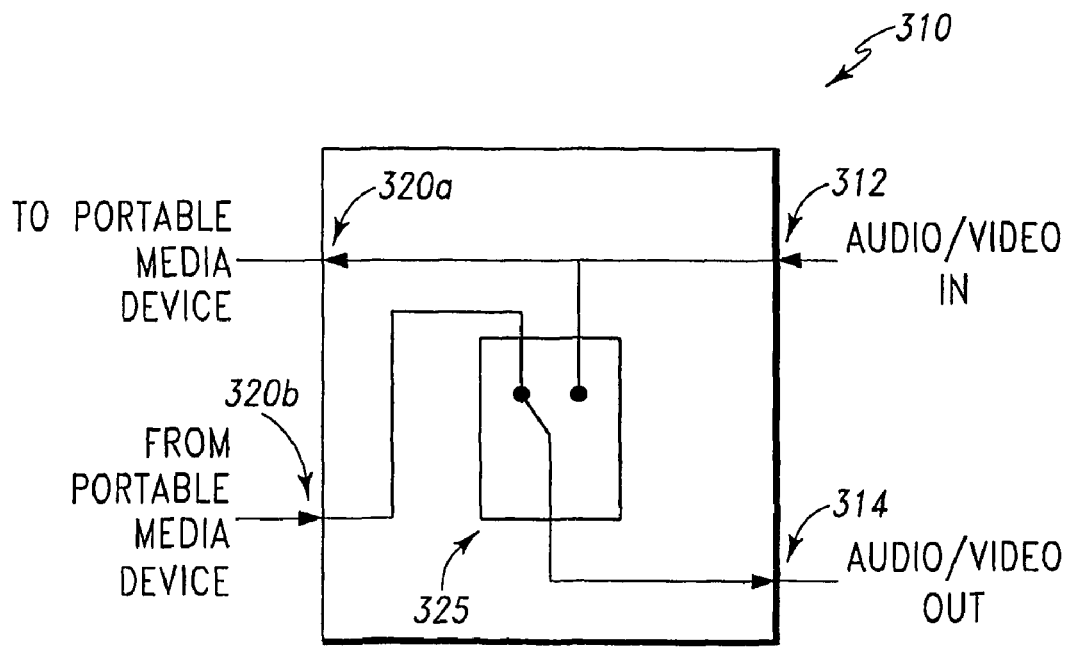
FIG. 5 is an illustration of another operating mode of an embodiment of the present invention.

Turning to FIG. 5, another illustration of a portion of the docking device 310 is shown. The simplified connection configuration shows the same components as described in FIG. 4. However, switch 325 is shown in a switch state representing portable device operation mode. Portable device operation mode is selected, for example, when the portable media device 360 is connected and active to the docking device 310. In a preferred embodiment, the portable media device 360 is physically sitting or docked in the docking device 310 and the portable media device 360 is powered on. Operation in portable device operation mode connects the A/V in connector 312 to portable media device connector 320 at connection 320a. Portable device operation mode further connects the A/V out connector 314 to the portable media device connector 320 at connection 320b through switch 325. In this manner, the audio and video signals at the A/V in connector 312 are provided to the portable media device 360 allowing either playback on the portable media device 360 or recording using the portable media device memory. The portable media device 360 may additionally provide audio and video signals to external devices connected through the A/V out connector 314.

Figure 6:
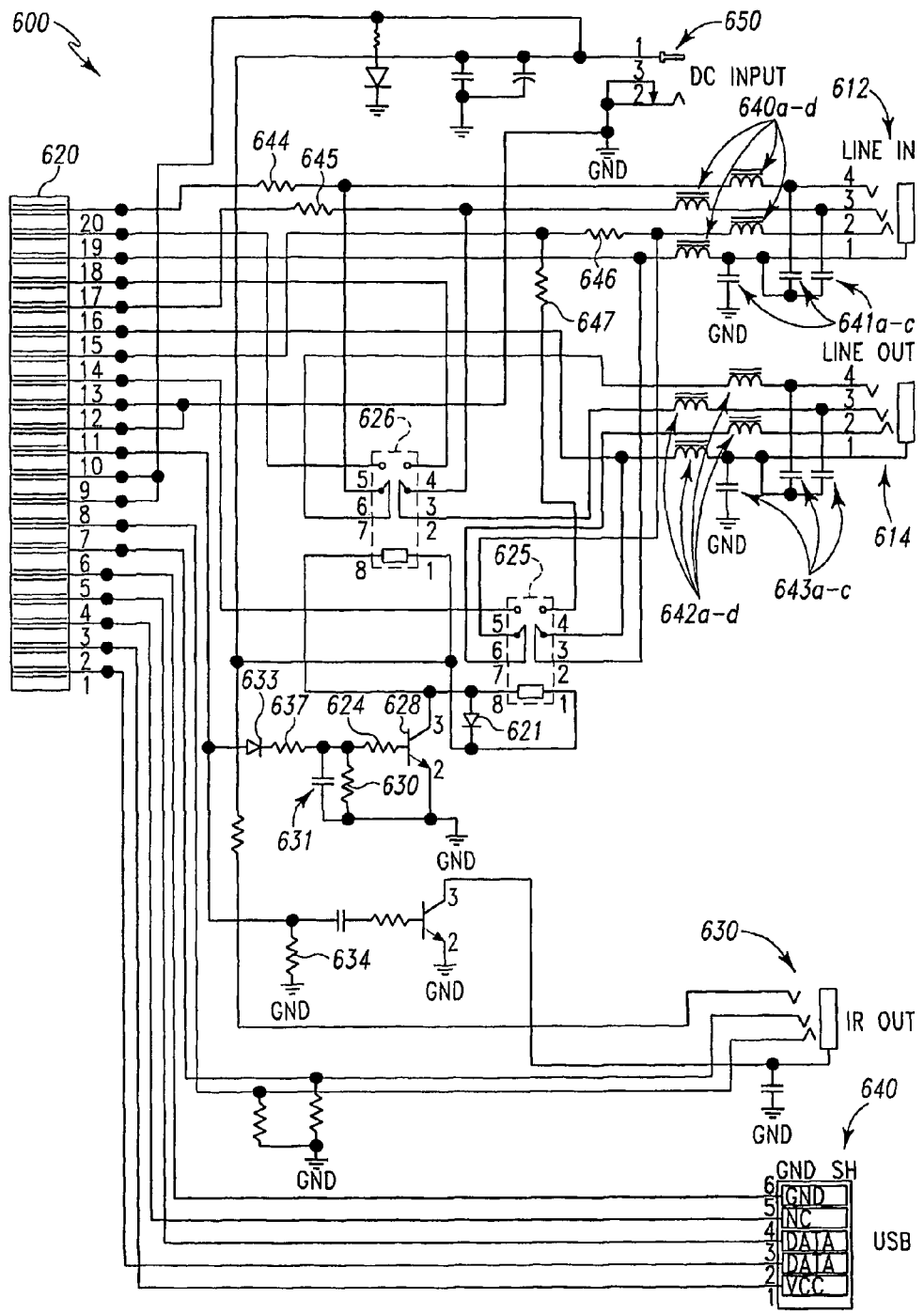
FIG. 6 is an electrical diagram of an embodiment of the present invention.

Turning to FIG. 6, an electrical diagram representing the electrical components and connections of a docking station 600 is shown. Docking station 600 contains features similar to those identified with docking device 120 in FIG. 1 and docking station 310 in FIG. 3. Further, the functions and blocks associated with the electrical components are similar to those described for the docking station 310 in FIG. 3 and will not be further described here.

Line in connecter 612 and line out connector 614 provide signal connections for left and right audio and video. Each of the signal paths on both the line in connector 612 and line out connector 614 connect to filtering components in the form of shunt capacitors 641a-c and 643a-c. Additional series circuit filtering on each of the signal paths as well as the ground connection path is performed by inductances 640a-d and 642a-d. The filtering components filter out unwanted signals such as signals that may be induced into the cabling used for connecting the docking station 600 to external devices. The left and right audio signal paths containing inductors 640a and 640b connect to resistors 644 and 645 respectively. The resistors 644 and 645 provide a nominal source impedance, for example 1000 ohms, for connection to the audio input circuits in the portable media device through pins 16 and 20 on connector 620. The left and right audio signal paths, at a point before the connection to resistors 644 and 645 also connect to pins 3 and 6 of relay switch 626. Similarly the left and right audio signals from line out connector 614, after passing through the filtering inductors 640a and 640b, connect to pins 2 and 7 of relay switch 626. Pins 4 and 5 of relay switch 626 are connected to pins 17 and 19 of portable media device connector 620 providing the left and right audio output signals from the portable media device.

Switch relay 626 contain internally two separate switches working in unison and containing two separate switch states or positions for each switch. Switch relay 626 is commonly referred to as a double pole double throw (DPDT) switch and may be constructed using any technique known to those skilled in the art. In a preferred embodiment, switch relay 626 is an electromagnetic relay operated by energizing a coil to change the position of a contact from a normally closed position. The normally closed terminals internal to switch relay 626 are connected to pins 3 and 6 respectively. The normally open terminals are connected to pins 2 and 7 and the common terminals are connected to pins 4 and 5 forming a switch connection arrangement as described in FIG. 3.

The video signal path from the line in connector 612 connects through inductor 640c and further connects through resistor 646 to pin 14 of portable media connector 620. The video signal path, before connecting to resistor 646 is also provided to pin 6 of switch relay 625. Additionally, the video signal path, after passing through resistor 646 is connected through a second resistor 647 and provided to pin 4 of switch relay 625. The video signal output connection from the portable media device connects through pin 13 of portable media connector 620 connects to pin 6 of switch relay 625.

Switch relay 625 operates in the same manner as described for switch relay 626 except that the video signal uses both internal switches in order to provide additional necessary video signal conditioning depending on the state of the relay switch 625. Pin 7 of switch relay 625 provides the video signal to the conditioning circuits and the line out connector 614. Pin 3 of switch relay 625 is connected through conditioning circuits to the ground of line out connector 614. Pin 2 is connected through conditioning circuitry to the ground of line in connector 612. Switch relay 625 is connected to the video signal path and ground path in a specific manner. The connections are made as described in order to maintain proper connection and termination of the video signal in both switch states of switch relay 625.

A control signal path from the portable media device connects through pin 10 of portable media connector 620. The control signal from the portable media device is used as the control for the control circuit using transistor 628 configured to energize the switching coils, labeled as pins 1 and 3 on switch relay 625 and switch relay 626. Transistor 628, along with resistors 629, 630, 632, and 634, diode 633, and capacitor 631 are configured in an open collector transistor circuit arrangement connected to the control signal path.

In operation, the control signal remains near zero volts DC or in a low state, no voltage is applied to the base terminal of transistor 628. If the base emitter junction of transistor 628 is not forward biased, the collector of transistor 628 will not allow current to flow from the DC power supply input through the switching coils preventing the coils from energizing and switching the states of the switch relays 525 and 526. However, when the control signal is approximately 3.3 volts DC or in a high state, a voltage scaled by resistors 630, 632, and 634 and diode 633 is applied to the base of transistor 628 through resistor 629. The voltage applied at the base of transistor 628 forward biases the base emitter junction of transistor 628 allowing current to flow through the collector of transistor 628. As a result, current flows from pin 1 of switch relay 625 and switch relay 626. Pin 1 of switch relay 625 and switch relay 626 is connected to the power supply input 650 for supplying the current. The current through pin 1 energizes the coils of switch relay 625 and switch relay 626 causing the switches to change states. Diode 627 is connected in parallel with pins 1 and 3 of switch relay 625 and switch relay 626 to prevent errant operation and damage to the switching coils.

The docking station 600 provides for different interconnections of the devices in a home entertainment system as well as operational modes for the portable media device 140 as described above. The docking station 600 allows the routing of signals between the various devices to change as a result of either the presence of the portable media device 140 in the docking station 600 or the inputs or actions of a user.

First, if the portable media device 140 is not sitting in the docking station 600, then switch relays 625 and 626 will be in a de-energized or normal state. In the de-energized switch state, the line in connector 612 and line out connector 614 will be connected together in a loop through mode. Loop through mode allows for signals delivered to the docking station 600 to continue through the docking station 600 and be delivered through the output connection to another media device, such as display device 130, or back to the first media device 110. Also, in this state, no charging of the battery in the portable media device 140 is done since the portable media device 140 is not connected to the docking station 600. Further, the docking station 600 itself does not require power from a power source in order for the loop through condition as described to operate.

Second, if the portable media device 140 is sitting in the docking station, but the portable media device 140 is turned off or otherwise is not active, switch relays 625 and 626 will remain in a de-energized state or normal state. The control signal from the portable media device 140 will not change the state of the switch relays 625 and 626, allowing for signals delivered to the docking station 600 to continue through the docking station 600 and be delivered through the output connection to another media device 130 or back to the first media device 110. The portable media device 140 may be sitting in and connected to the docking station 600, but the operation of the loop through mode connection will be unaffected while the portable media device 140 is in the off state. However, the charging operation for the battery in the portable media device 140 will commence if the battery needs charging. Many charging methods may be used, as is well known to those skilled in the art.

Third, if the portable media device 140 is sitting in the docking station and turned on or otherwise active, the control signal from the portable media device 140 will energize the switch relays 625 and 626 causing them to change state. Signals provided to the line in connecter 612 of the docking station are disconnected from line out connector 614 and instead, provided to the portable media device 140 through connector 620. Additionally signals provided from the portable media device are provided to line out connector 614 through connector 620 and switch relays 625 and 626. The signal at the line out connector 614 may be provided to other external media devices such as media device 110 or display device 130. In this manner the portable media device 140 can receive signals delivered from a source such as media device 110 and can itself deliver signals to other devices such as display device 130. The charging operation for the battery in the portable media device 140 may also commence as needed.

Further, the portable media device 140 may internally permit a loop through feature, providing the audio and video input signals to the audio and video output on the portable media device 140 itself. The portable media device 140 may also permit some signal processing in addition to passing the signals through. The portable media device 140 may allow control of the loop through feature by way of user inputs using a button on the portable media device or a menu item in the user interface display. In this manner, the portable media device 140 may pass the input signals to the output, process input signals before passing the signals through, store the input signal, or may produce and convey different signals at its output depending on user input.

Figure 7:
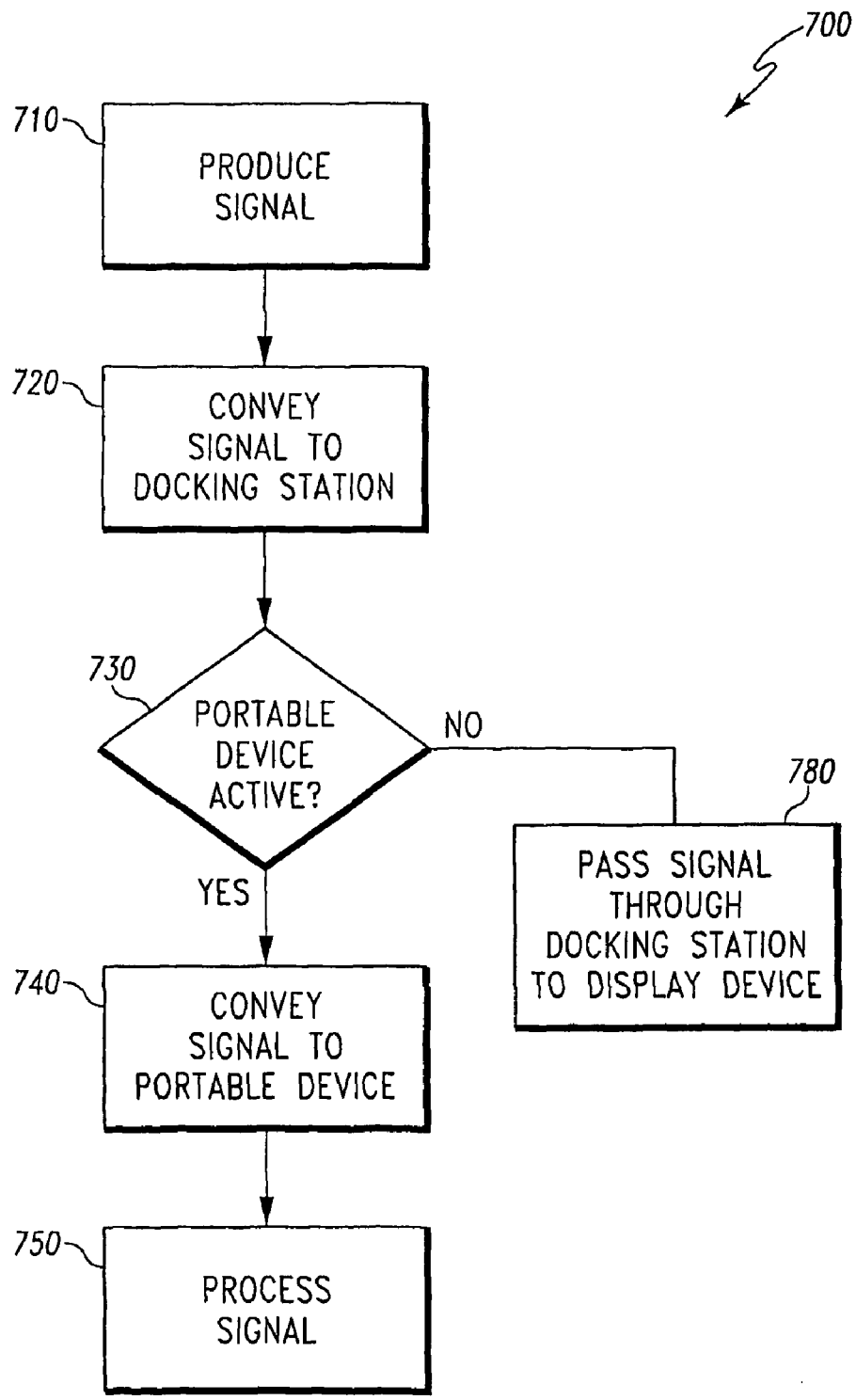
FIG. 7 is a flow chart illustrating an exemplary process of an embodiment of the present invention.

Turning to FIG. 7, a flow chart illustrating an exemplary process 700 of using a docking device 120 and associated portable media device 140 in a system including other media devices such media device 110 and display device 130 is shown. At step 710, a signal containing only audio content, only video content, or both audio and video content is produced. The signal may be in either an analog or digital format. The signal may be produced by, for example, demodulating a received signal from a terrestrial, cable, or satellite broadcast system in media device 110. The signal may also be produced by retrieving the signal from a storage element in media device 110 such as a videocassette, compact disc, or hard disk drive. In a preferred embodiment, the signal may be produced in media device 110 by demodulating a received external signal from a cable system and generating left and right analog audio signals and an analog video signal.

Next, at step 720, the signal, containing the content, is conveyed from the device that produced the signal, such as media device 110, to one or more other devices through one or more connecting cables. The signal may be conveyed to more than one device at the same time. The device that produced the signal, such as media device 110, may also include a controller responsive to user inputs for determining where the signal is to be conveyed. In the preferred embodiment, the signal is conveyed to a docking station 120, used in conjunction with, or associated with, a portable media device 140.

Next, at step 730, if the portable media device 140 is connected to the docking station 120 and turned on, or otherwise active for processing is the signal, then at step 740, the docking station 120 conveys the signal to the portable media device 140. The portable media device 140, at step 750, after receiving the signal conveyed by the docking station 120, processes the signal. The processing of the signal by the portable media device 140 will be further described below.

However, if the portable media device 140 is either not connected to the docking station 120, not turned on, connected to the docking station 120 and only charging, or otherwise not active for processing the signal, then at step 780, the signal is passed through the docking station 120 and conveyed to the device connected to the output of the docking station, such as display device 130 or media device 110. Step 780 allows the docking station 120, in this mode, to act as a loop through device providing the signal from the input of the docking station 120 to the output of the station without providing the signal to the portable media device 140.

Figure 8:
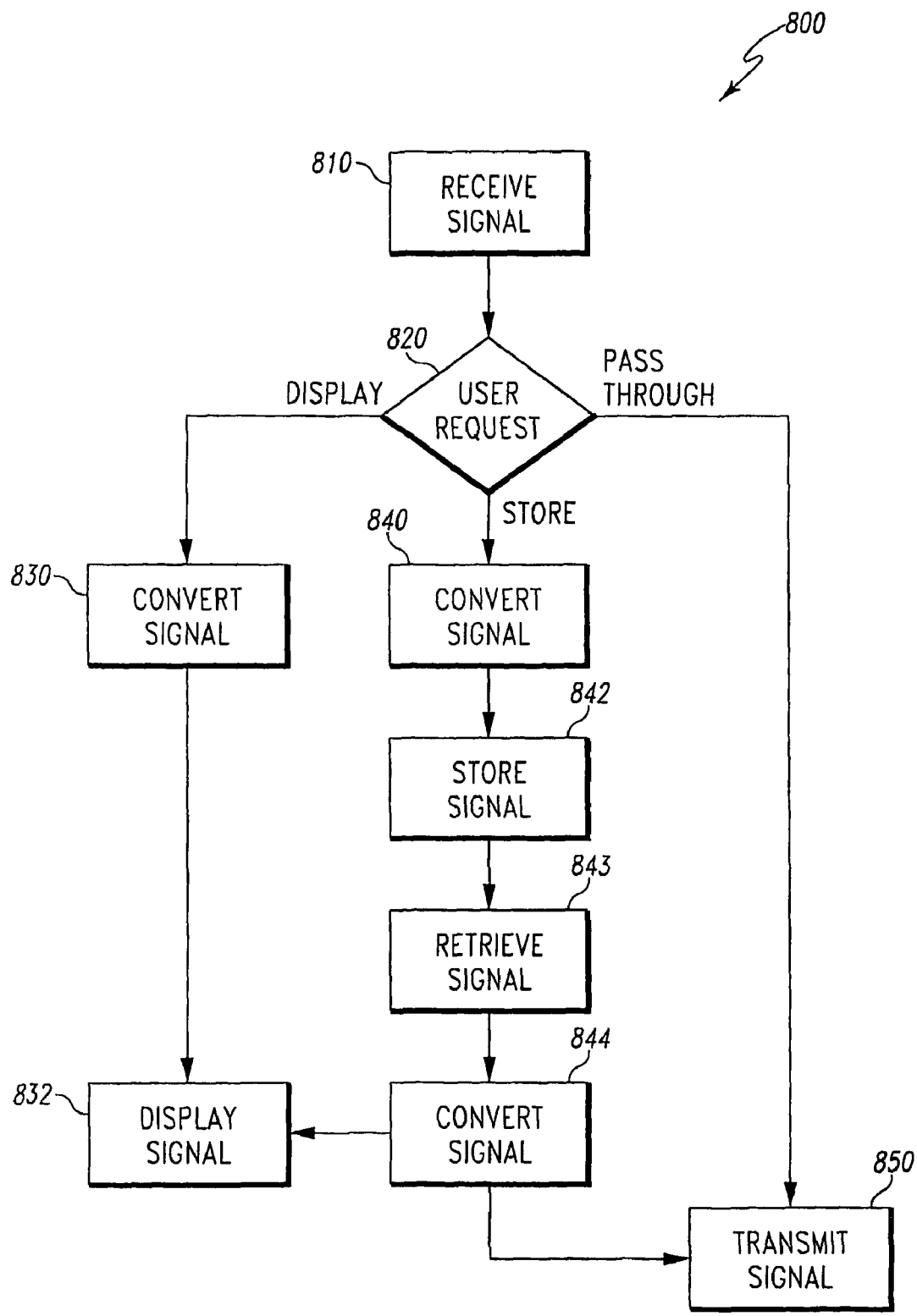
FIG. 8 is a flow chart illustrating another exemplary process of an embodiment of the present invention.

Turning to FIG. 8, a flow chart further illustrating the process 800 involved in processing the signal is shown. Process 800 illustrates further steps that may be performed during, for instance, processing step 750 shown in FIG. 7. At step 810, the signal is received by the portable media device 140. The portable media device 140 then determines, at step 820, the additional processing necessary for the signal. The additional processing may be determined based on inputs from a user. For example, a user may use a set of menu entries on a video display or use direct control buttons to instruct the device what additional processing should occur on the signal.

Each determination processing path shown is not entirely independent, and may not utilize every process step shown. Further, two or more determination processing paths may occur simultaneously. Also, there may be no direct time relation between the steps and when they occur. Other determination processing paths may also be possible and would follow similar steps based on a similar input arrangement.

If the determination from input request at step 820 indicates displaying the signal, then at step 830, the signal may be converted from its input signal format into a display format. For example, the input signal may be a composite analog video signal, and may be processed to produce a set of signals known a red, green, blue video drive signals in order to properly produce video on the video display. The input signal may also be a digital audio signal and may be converted from the digital audio format into a left analog audio signal and a right analog audio signal. At step 832, the converted signal is displayed on a video display. The display step 832 may also include providing the converted audio signal through speakers or to a headphone connector.

If the determination from input request at step 820 indicates storing the signal, then at step 840, the signal may be converted from its input signal format into a storage format. For example, the input signal may be a composite analog video signal, and may be processed to produce a compressed digital video signal in MPEG-4 format. The input signal may also be a digital audio signal and may be converted in a compressed digital audio signal in MP-3 format. At step 842, the compressed signal is stored in memory. The storage medium for the memory may be an electronic medium such as flash memory or may be a larger capacity storage device such as a hard disk drive.

Once the compressed signal is stored at step 842, additional steps may take place either simultaneously or at a later time. The compressed signal may be retrieved from memory at step 843. At step 844, the retrieved signal may be converted back from a compressed signal format. The conversion step 844 may convert the retrieved signal to a format such as described earlier for displaying the signal at step 832. Additionally the conversion step 844 may convert the retrieved signal to a format for outputting from the portable media device 140, at step 850. The output format may be similar to the original input signal provided to the portable media device 140.

If the determination from input request at step 820 indicates passing through the signal, then at step 850, the signal may be transmitted back out of the portable media device 140 using the output connector. In this manner, the portable media device 140 itself may act as a loop through providing the input signal directly to the output.

The advantages of the apparatus and method provided by the embodiments of this disclosure may be recognized by the fact that the docking device or station serves as a stationary interface between a portable media device and a home entertainment system containing other media devices. The interface does not require any connection changes with the home entertainment system in the presence or absence of the portable media device when it is also used with the media devices in the home entertainment system.

While the disclosure may be susceptible to various modifications and alternative forms, specific embodiments have been shown by way of example in the drawings and will be described in detail herein. However, it should be understood that the disclosure is not intended to be limited to the particular forms disclosed. Rather, the disclosure is to cover all modifications, equivalents and alternatives falling within the spirit and scope of the inventive aspects of the disclosure as defined by the following appended claims.

What is claimed is:

1. A method for conveying a signal between multiple media devices and a portable device using a docking station, comprising the steps of:
   receiving said signal from a first media device at an input of said docking station, said docking station for charging said portable device;
   determining if the portable device is connected to said docking station;
   conveying said signal to said portable device if it is determined that said portable device is connected to said docking station;
   conveying said signal through said docking station to a second media device if it is determined that said portable device is not connected to said docking station; and
   conveying said signal through said docking station to said second media device when said portable device is connected to said docking station and not active, the step further including conveying said signal through said docking station to said second media device when said docking station is charging said portable device.

2. The method set forth in claim 1, wherein said signal includes at least one of an analog audio signal and an analog video signal.

3. The method set forth in claim 1, wherein the step of conveying said signal to said portable device further includes conveying said signal to said portable device from said docking station when said portable device is active.

4. The method set forth in claim 1, wherein the step of conveying said signal to said portable device further includes conveying said signal to said portable device from said docking station when said portable device is powered on.

5. The method set forth in claim 1, wherein the step of conveying said signal to said portable device is responsive to said portable device.

6. A docking device, said docking device (310) comprising:
   a first interface for connecting said docking device to a portable electronic device, said first interface permitting said docking device to charge said portable electronic device and to route signals to and from said portable electronic device, said docking device for charging said portable electronic device;
   a second interface for connecting said docking device to a first media device, said second interface permitting said docking device to route said signals from said first media device;
   a third interface for connecting said docking device to a second media device, said third interface permitting said docking device to route signals to said second media device; and
   a switch for switchably connecting said second interface to said third interface when said portable electronic device is not connected to said docking device, for switchably connecting said second interface to said third interface said when said docking device is charging said portable electronic device, and for switchably connecting said first interface to said second interface when said portable electronic device is connected to said docking device, wherein
   said switch is responsive to determining said portable electronic device is connected to said docking device.

7. The docking device of claim 6, wherein said signals comprise an analog audio signal and an analog video signal.

8. The docking device of claim 7, wherein said second interface further comprises separate signal paths for said analog audio signal and said video signal.

9. The docking device of claim 7, wherein said third interface further comprises separate signal paths for said analog audio signal and said video signal.

10. The docking device of claim 6, wherein said switch is responsive to said portable electronic device when said portable electronic device is connected to said docking device.

11. The docking device of claim 6, wherein said switch switchably connects said first interface to said second interface when said portable electronic device is connected to said docking device and said portable electronic device is powered on.

12. The docking device of claim 6, wherein said switch switchably connects said first interface to said third interface when said portable electronic device is connected to said docking device and said portable electronic device is powered on.

13. The docking device of claim 6, wherein said switch switchably connects said second interface to said third interface when said portable electronic device when said portable electronic device is connected to said docking device and said portable electronic device is powered off.

14. The docking device of claim 6, wherein said switch switchably connects said second interface to said third interface when said docking device is powered on.

15. The docking device of claim 6, wherein said first interface communicates a control signal from said portable electronic device to said switch.

16. The docking device of claim 6, wherein said portable electronic device is a portable media device for displaying video and audio content.

17. A system for conveying audio and video signals to media devices, comprising:
- means for receiving said audio and video signals from a first media device at an input of a docking station, said docking station for charging a portable device;
- means for determining if the portable device is connected to said docking station;
- a means for conveying said audio and video signals to said portable device if it is determined that said portable device is connected to said docking station;
- a means for conveying said audio and video signals through said docking station to a second media device if it is determined that said portable device is not connected to said docking station; and
- a means for conveying said audio and video signals through said docking station to said second media device when said portable device is connected to said docking station and not active including conveying said audio and video signals through said docking station to said second media device when said docking station is charging said portable device.

18. The apparatus of claim 17 wherein said means for conveying said audio and video signals to said portable device further includes a means for conveying said audio and video signals to said first media device from said docking station when said portable device is powered on.

19. The apparatus of claim 17 wherein said means for conveying said audio and video signals to said portable device is responsive to said portable device.

20. A method for conveying a signal between multiple media devices and a portable device using a docking station, comprising the steps of:
- receiving said signal from a first media device at an input of said docking station, said docking station for charging said portable device;
- determining if the portable device is connected to said docking station;
- conveying said signal to said portable device if it is determined that said portable device is connected to said docking station; and
- conveying said signal through said docking station to a second media device when said docking station is charging said portable device.

21. A docking device, said docking device (310) comprising:
- a first interface for connecting said docking device to a portable electronic device, said first interface permitting said docking device to charge said portable electronic device and to route signals to and from said portable electronic device, said docking device for charging a portable electronic device;
- a second interface for connecting said docking device to a first media device, said second interface permitting said docking device to route said signals from said first media device;
- a third interface for connecting said docking device to a second media device, said third interface permitting said docking device to route signals to said second media device; and
- a switch for switchably connecting said second interface to said third interface when said docking device is charging said portable electronic device and for switchably connecting said first interface to said second interface when said portable electronic device is connected to said docking device, wherein
- said switch is responsive to determining said portable electronic device is connected to said docking device.

22. A system for conveying audio and video signals to media devices, comprising:
- means for receiving said audio and video signals from a first media device at an input of a docking station, said docking station for charging said portable device;
- means for determining if the portable device is connected to said docking station;
- a means for conveying said audio and video signals to said portable device if it is determined that said portable device is connected to said docking station; and
- a means for conveying said audio and video signals through said docking station to a second media device when said docking station is charging said portable media device.

* * * * *